US012619200B2

(12) United States Patent
Forsey et al.

(10) Patent No.: US 12,619,200 B2
(45) Date of Patent: May 5, 2026

(54) ANIMATION MECHANISM FOR A TIMEPIECE

(71) Applicant: Greubel Forsey S.A., La Chaux-de-Fonds (CH)

(72) Inventors: Stephen Forsey, Les Brenets (CH); Florian Corneille, Mathay (FR)

(73) Assignee: GREUBEL FORSEY S.A., La Chaux-de-Fonds (CH)

( * ) Notice: Subject to any disclaimer, the term of this patent is extended or adjusted under 35 U.S.C. 154(b) by 351 days.

(21) Appl. No.: 18/254,435

(22) PCT Filed: Dec. 6, 2021

(86) PCT No.: PCT/EP2021/084321
§ 371 (c)(1),
(2) Date: May 25, 2023

(87) PCT Pub. No.: WO2022/122615
PCT Pub. Date: Jun. 16, 2022

(65) Prior Publication Data

US 2024/0027970 A1 Jan. 25, 2024

(30) Foreign Application Priority Data

Dec. 7, 2020 (CH) ....................................... 1550/20
Dec. 7, 2020 (EP) ..................................... 20212286

(51) Int. Cl.
*G04B 47/04* (2006.01)
*G04B 45/00* (2006.01)

(52) U.S. Cl.
CPC ....... *G04B 47/044* (2013.01); *G04B 45/0038* (2013.01)

(58) Field of Classification Search
None
See application file for complete search history.

(56) References Cited

U.S. PATENT DOCUMENTS 8,995,233 B2 * 3/2015 Goeller ................ G04B 19/262 368/18
2014/0126338 A1 * 5/2014 Forsey ................. G04B 17/285 368/127

FOREIGN PATENT DOCUMENTS

CH 707163 A2 5/2014
CH 708473 A2 2/2015
(Continued)

OTHER PUBLICATIONS

International Search Report for PCT/EP2021/084321 mailed Apr. 11, 2022, 2 pages.
(Continued)

*Primary Examiner* — Renee S Luebke
*Assistant Examiner* — Matthew Daniel Hwang
(74) *Attorney, Agent, or Firm* — NIXON & VANDERHYE

(57) ABSTRACT

An animation mechanism for a timepiece, includes a support system bearing a first decorative object intended to be animated by a rotation about a first axis of rotation and about a second axis of rotation under the effect of a drive source. The support system includes a first frame mounted to pivot on a cage element about said first axis of rotation, and an inner frame mounted to pivot in the first frame about the second axis of rotation which is substantially orthogonal with respect to the first axis of rotation, the inner frame bearing a second decorative object. The inner frame is arranged to be driven by an eccentric driving element secured in rotation to a drive wheel arranged to be driven directly or indirectly by the drive source.

15 Claims, 6 Drawing Sheets

(56) References Cited

FOREIGN PATENT DOCUMENTS

| | | | | | |
|---|---|---|---|---|---|
| CH | 712267 | A1 | | 9/2017 | |
| EP | 2728420 | A1 | | 5/2014 | |
| EP | 3483664 | A1 | | 5/2019 | |
| FR | 2988866 | A1 | | 10/2013 | |
| WO | 2006050743 | A1 | | 5/2006 | |
| WO | 2013004782 | A1 | | 1/2013 | |
| WO | WO-2014037294 | A1 | * | 3/2014 | ............. G04D 7/009 |

OTHER PUBLICATIONS

Written Opinion of the ISA for PCT/EP2021/084321 mailed Apr. 11, 2022, 6 pages.

* cited by examiner

ANIMATION MECHANISM FOR A TIMEPIECE

This application is the U.S. national phase of International Application No. PCT/EP2021/084321 filed Dec. 6, 2021 which designated the U.S. and claims priority to CH 01550/20 filed Dec. 7, 2020, EP 20212286.7 filed Dec. 7, 2020, the entire contents of each of which are hereby incorporated by reference.

TECHNICAL FIELD

The present invention relates to the field of horology. It relates, more particularly, to an animation mechanism which comprises at least two decorative objects, the latter notably being able to be astral representations.

STATE OF THE ART

The document FR2988866 describes an animation mechanism for a precious or semi-precious stone, in which a drive spring is arranged to animate the stone with a rotational movement about a single axis of rotation by a flexible belt. The stone is mounted on a shaft by four claws or jaws, which hold it in place. However, the movement of the stone is monotonic and allows only one of its faces to be seen, which always presents the same angle to the wearer and consequently limits its visibility.

The document CH708473 discloses an astral animation mechanism, which comprises a pivoting disc representing the Earth as well as a disc of larger diameter provided with an off-centre circular aperture defining a representation of the Moon. When the mechanism is running, the representation of the Earth rotates and that of the Moon orbits about the Earth. A supplementary disc underlying that of the Moon further makes it possible to display the phases of the Moon. This mechanism is indeed interesting but is limited to a flat display.

The “GMT” piece commercialised by Greubel Forsey presents a three-dimensional representation of the northern hemisphere of the Earth, which rotates before a 24-hour scale. The visibility of this convex representation is relatively limited, notably when wanting to see places close to the equator, and where no representation of the Moon is present.

The document CH707163 describes various variations of mechanisms, in which a three-dimensional representation of the Moon is shown, which orbits about an axis, on which there can be a representation of the Earth. However, the visibility of the representation of the Moon is limited and possibilities for other variant displays are also relatively limited.

The document WO2006/050743 describes a winding mechanism for an automatic watch. Even while considering that a timepiece can be a “decorative object”, this document discloses no second decorative object within the meaning of the invention.

The document WO2013/004782 discloses a “cardan” tourbillon, in which the sprung balance is borne by an inner ring mounted to pivot inside an outer ring. Once again, and even while considering that the sprung balance can be a “decorative object”, no second decorative object within the meaning of the invention is disclosed therein.

The aim of the invention is consequently to propose an animation mechanism in which the abovementioned defects are at least partially overcome.

DISCLOSURE OF THE INVENTION

More specifically, the invention relates to an animation mechanism as defined by claim 1. This mechanism comprises a support system bearing a first decorative object intended to be animated with a rotation about a first axis of rotation and about a second axis of rotation under the effect of a drive source, this being directly or indirectly. The drive source can be mechanical or electric, and can be dedicated to the mechanism or can be that which supplies the drive force for a timepiece.

Said support system comprises a first frame mounted to pivot on a cage element about said first axis of rotation, and an inner frame mounted to pivot in said first frame about said second axis of rotation which is substantially orthogonal with respect to said first axis of rotation (that is to say that the inner frame is pivoted on the first frame, thus defining a cardan system), said inner frame directly or indirectly bearing a second decorative object. Said inner frame (and thus the first decorative object) is arranged to be driven by an eccentric driving element secured in rotation to a drive wheel arranged to be driven directly or indirectly by said drive source.

By these means, an original animation is obtained, the reciprocating movement about the abovementioned two axes thus obtained allowing a good visualisation of the two decorative objects. This animation can represent a large number of possibilities, notably in the case where the decorative objects are astral representations, which will become clear from the detailed description.

Advantageously, said first decorative object is borne by a shaft mounted to pivot in said inner frame about a third axis of rotation, said shaft being secured in rotation to a pinion meshing with a toothing which is coaxial to said drive wheel, and which can be fixed or arranged to be animated with a rotation. The first decorative object can thus pivot about its own axis of rotation.

In another variant, said first decorative object is borne by a supplementary frame pivotingly mounted about the third axis of rotation defined by the abovementioned shaft. The supplementary frame is arranged to be driven in rotation by an intermediate transmission borne by the inner frame and arranged to be driven by a toothed organ secured in rotation to said shaft.

The first decorative object can thus be arranged to pivot at a rotation speed which is different from that of the shaft, if desired.

Advantageously, said eccentric driving element is a crank or a lever, which represents a solution that is relatively simple and easy to implement.

Advantageously, said second decorative object is arranged to perform an orbital movement about the first decorative object. In such a case, said second decorative object can be borne by a rotating plate arranged to pivot about said third pivoting axis.

Advantageously, said rotating plate is driven in rotation by a wheel pivotingly mounted on said rotating plate and meshing on the one hand with a toothed organ which is secured in rotation with the shaft, and on the other hand with a supplementary fixed wheel secured in rotation to the inner frame. When the shaft pivots, the plate is thus driven in rotation and said second decorative object orbits around the first.

Advantageously, said second decorative object is arranged to perform a rotation about its own axis, which allows the constructor a large number of possibilities in respect of the animations.

Advantageously, said second decorative object is arranged to be able to rise up and lower down with respect to the plane of said inner frame. This notably makes it possible to represent the fact that the orbit of the Moon is not coplanar with the equator of the Earth, or simply to animate another object in this manner.

Advantageously, the mechanism further comprises a cover which surrounds a part of the first decorative object, which is useful for illustrating, for example, the illuminated portion of the Earth when the first decorative object is a representation of the Sun and the second decorative object is a representation of the Earth.

Advantageously, the pivoting guard is arranged to pivot about said second decorative object, which is useful for illustrating the Moon phase or the like when the first decorative object is a representation of the Earth and said second decorative object is a representation of the Moon. In such a case, said pivoting cover can be secured in rotation to a wheel arranged to be driven in rotation by a toothed organ secured in rotation to said shaft.

This mechanism is notably intended to be incorporated in a timepiece.

BRIEF DESCRIPTION OF THE DRAWINGS

Other details of the invention will become more clearly apparent upon reading the following description, in reference to the attached drawings in which.

EMBODIMENTS OF THE INVENTION

Figure 1:
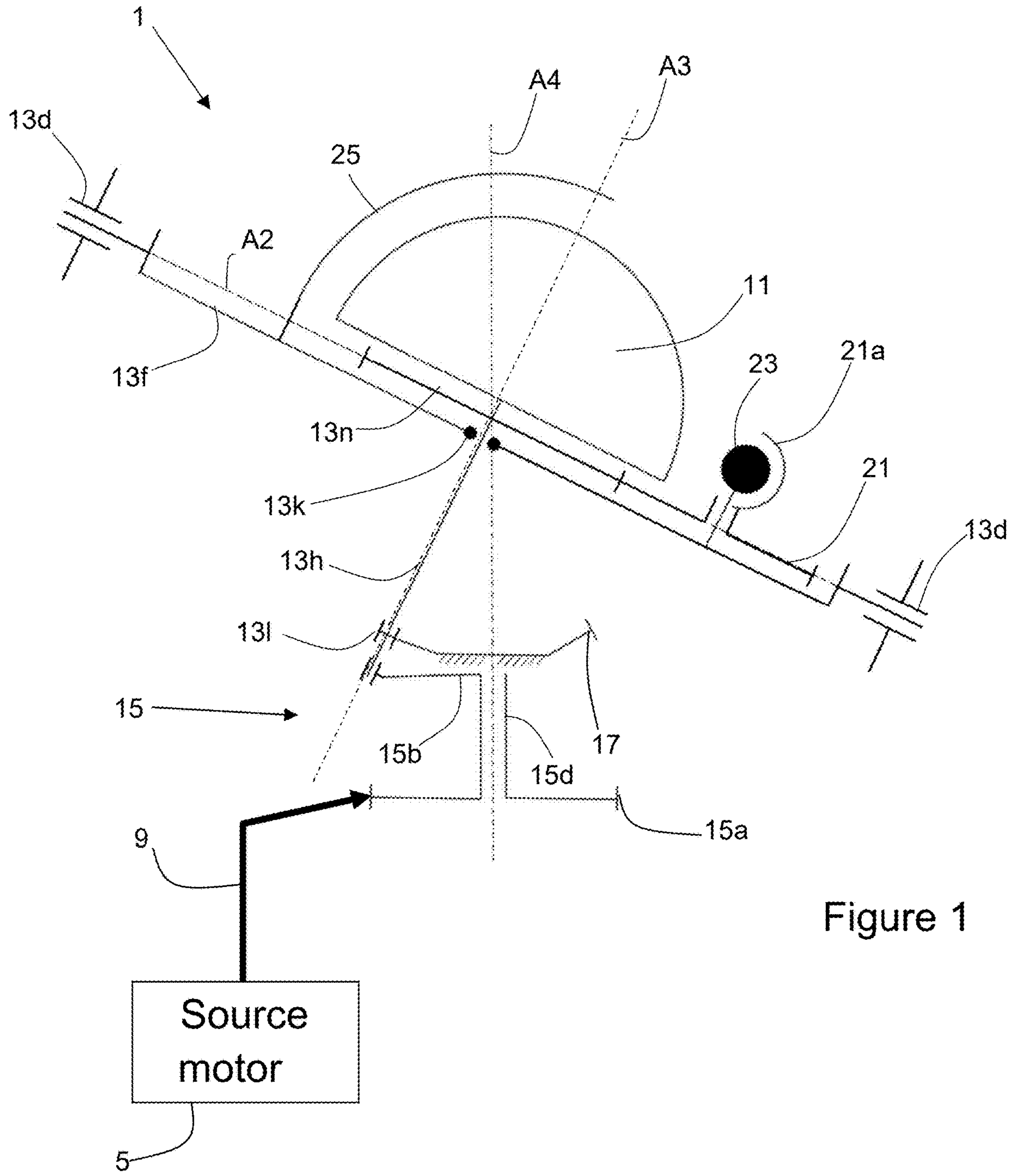
FIG. 1 is a lateral schematic view of an animation mechanism according to the invention, the first frame not having been represented.
Figure 2:
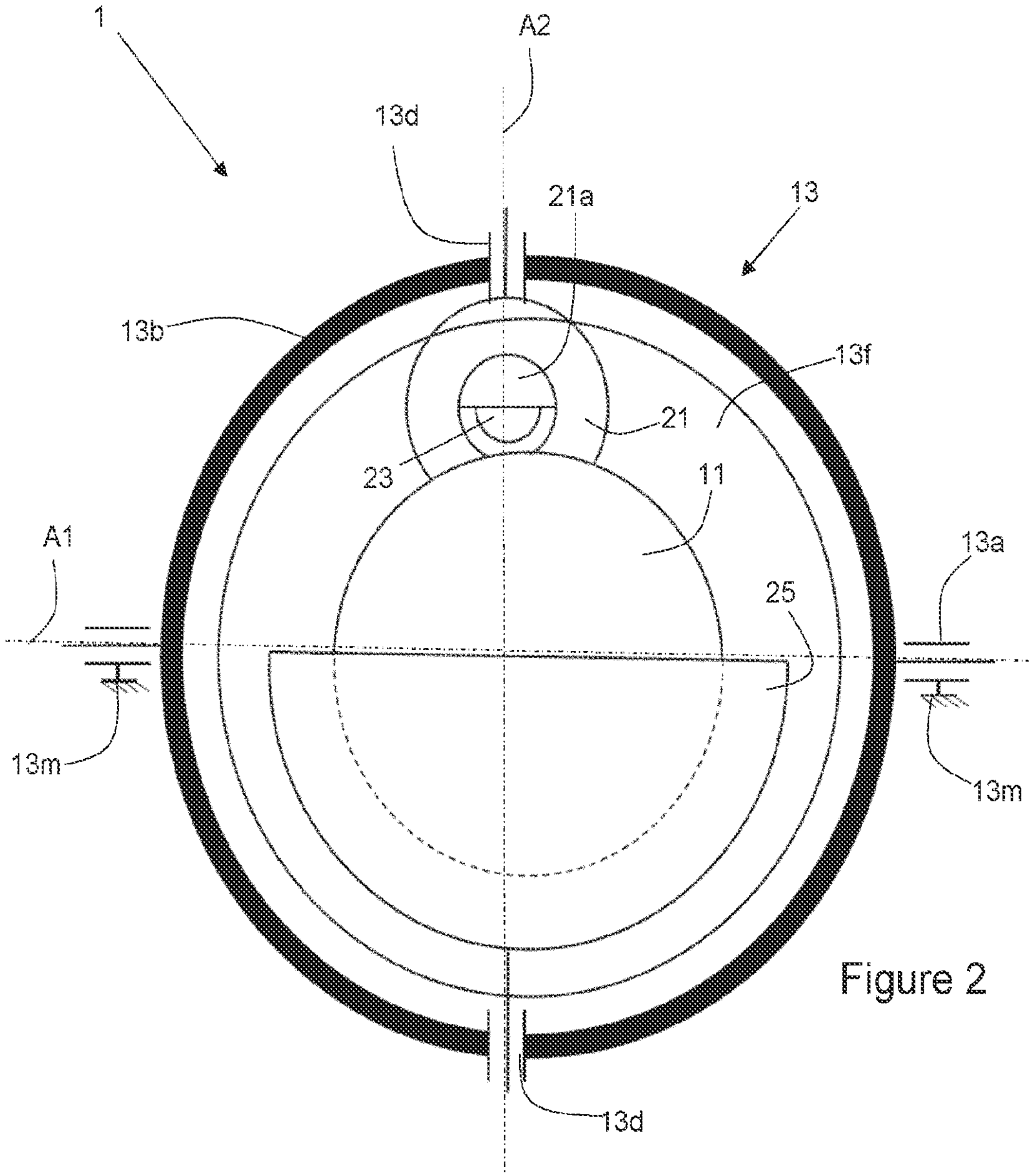
FIG. 2 is a plan schematic view of the mechanism of FIG. 1, the line of sight being at right angles to the plane of the first frame.

FIGS. 1 and 2 illustrate a first embodiment of an animation mechanism 1 according to the invention.

This latter comprises a first decorative object 11 as well as a second decorative object 23, supported by a particular support system 13. The first decorative object is of three-dimensional form and can be a jewel, another decorative object (sculpture, glass ball, a piece of stone, etc.), or an astral representation which represents, for example, a hemisphere or all of the Earth, any planet, the Moon, the Sun, a portion of the night sky, at least a part of any other astral body, or the like. The second decorative object 23 is off-centre with respect to the first 11, and is also of three-dimensional form (sphere, hemisphere, etc). It can, for example, be another jewel or any other object, another astral representation such as a representation of the Moon when the first decorative object 11 is a representation of the Earth, a representation of a planet when the first decorative object 11 represents the Sun, a representation of the Earth when the first object is a representation of the Sun or a representation of the night sky, or even a representation of any other object which is a satellite of that represented by the first decorative object 11. It should be noted that each of said decorative objects 11, 23 is distinct from the support system 13, and is not a functional element such as a screw, balance, escapement, spring, wheel, support or the like. In other words, the decorative objects 11, 23 are purely decorative and are free of mechanical functionality in movement, whether it be a kinematic or support functionality.

The support system 13 links the decorative objects 11, 23 to a cage element (not represented) by a pair of pivots **13*a* borne by supports 13*m* arranged to be fixed to said cage (see FIG. 2**).

These pivots **13*a* define a first axis of rotation A1, about which is pivoted a first frame 13*b* (illustrated exclusively in FIG. 2 in order not to overload FIG. 1) formed by an annular ring of generally circular form in the construction illustrated. Other forms (oval, square, rectangular, etc.) are also possible, and it is not obligatory for the first frame 13*b* to be a complete ring. This frame 13*b* bears a pair of intermediate pivots 13*d*, which define a second axis of rotation A2, which is substantially orthogonal with respect to said first axis A1. An inner frame 13*f* is mounted to pivot about this second axis A2 inside the first frame 13*b* and bears the first decorative object 11. The inner frame 13*f*** takes the form of a circular plate in the variant illustrated, but other forms are possible (polygonal, skeleton, or any other ad hoc form).

In the construction illustrated, the decorative object 11 is supported by a shaft **13*h*, which passes through the inner frame 13*f* and is mounted in bearings 13*k* provided in said inner frame 13*f* such that said shaft 13*h*** can pivot with respect to this latter.

From the above, it is clear that the support system defines a cardan joint support, which confers on the inner frame **13*f* and the two decorative objects 11, 23 two degrees of freedom in rotation about axes A1 and A2, and, substantially, no degree of freedom in translation. The pivoting of the shaft 13*h* with respect to the inner frame 13*f* confers a third degree of freedom in rotation on the first decorative object 11 about a third axis A3, which corresponds to the geometrical axis of the shaft 13*h*. However, this third degree of freedom is not obligatory, in which case the first decorative object 11, and optionally also the shaft 13*h*, can be secured in rotation to the inner frame 13*f***.

The driving of the first decorative object 11 about the third axis A3 is assured by the cooperation between the toothing of a pinion **13*l* secured to the shaft 13*h* and a conical toothing 17 which is coaxial to the drive wheel 15 and is fixed in the construction illustrated. Other forms of toothings are also possible, such as, for example, an inner conical toothing borne by a crown ring or other ad-hoc gearings. Moreover, the toothing 17 can alternatively be driven in rotation instead of being fixed with respect to the chassis. In the case where the first decorative object 11 is secured in rotation to the inner frame 13*f*, the pinion 13*l* and the toothing 17** are not present.

In order to animate the inner frame **13*f*, and thus the decorative objects 11 and 23, the mechanism further comprises a drive wheel 15, which comprises a toothed wheel 15*a* arranged to be driven by a drive source 5, such as a barrel housing a drive spring, an electric motor or the like, a transmission 9 of any form that can be interposed kinematically between the drive source 5 and the drive wheel 15, if desired. Obviously, the interpositioning of supplementary toothed wheels and/or of other kinematic link forms such as belts or chains are also possible. The drive source 5** can be dedicated to the animation mechanism or can form part of a conventional horological movement.

The drive wheel 15, the axis of rotation A4 of which is arranged to substantially cross the intersection of the axes A1 and A2, also comprises an eccentric driving element 15*b*, which is secured in rotation to said toothed wheel 15*a* and is linked thereto by a shaft 15*d*. The eccentric driving element as illustrated takes the form of a lever or a bent crank fixed onto the shaft the free end of the eccentric element 15*b* cooperating with the end of the shaft 13*h* in order to drive it in a substantially circular path, the end of the shaft 13*h* being able to pivot in an ad hoc bearing provided at the free end of the eccentric element. In this way, when the drive wheel 15 rotates, the inner frame 13*f* is driven by a compound movement having two degrees of freedom in rotation, the amplitude of which is defined by the geometry of the support system 13 and the radius of the eccentric driving element 15*b*. This movement is reciprocal about each of the axes A1 and A2, which creates an inclined orbital movement of the first decorative object 11.

At the same time, the toothing of the pinion 13*l* secured to the shaft 13*h* rolls on the fixed toothing 17, which causes the decorative object 11 to pivot about the third axis A3.

By these means, the decorative object 11 pivots about the three axes A1, A2, A3.

It goes without saying that other constructions for the driving eccentric 15*b* are possible and that the gear ratios can be adapted to the needs of the constructor in order to animate the decorative object 11 by a desired rotation speed about the three axes of rotation.

It is also noted that the presence of a fixed cover 25, which is optional, and is secured to the inner frame 13*f*. This fixed cover 25 is arranged to cover a part of the first decorative object 11, for example in order to conceal the part of the Earth which is in shadow.

As mentioned above, a rotation of the first decorative object 11 about the third axis A3 is not obligatory. In such a case, the fixed toothing 17 and the pinion 13*l* secured to the shaft 13*h* need not be present, the movement of the first decorative object 11 being thus defined exclusively by reciprocating rotations about the two axes A1 and A2.

Moving now onto the second decorative object 23, the shaft 13*h* bears a toothed organ 13*n* which is secured to it in rotation. This toothed organ 13*n* meshes with an off-centre wheel 21 bearing a pivoting cover 21*a* which partially surrounds said second decorative object 23 and is arranged to pivot about the axis of the wheel 21. In this variant, the second decorative object 23 is secured in rotation to the inner frame 13*f*, and does not therefore pivot about its own axis.

Depending on the chosen gear ratios and drive speeds, this construction can, for example, represent the phases of the Moon and the approximate portion of the Earth which is illuminated by the Sun in real time, or according to an accelerated animation (which can correspond to accelerated reality or can be fanciful), and in any case the cardan movement allows the two decorative objects 11, 23 to be viewed from a greater quantity of angles with respect to the prior art, except for the parts covered by the respective covers 21*a* and (if present).

However, in a simplified variant, the elements 13*n* and 21, and/or one, the other or both of the two covers 21*a*, 25, need not be present.

Figure 3:
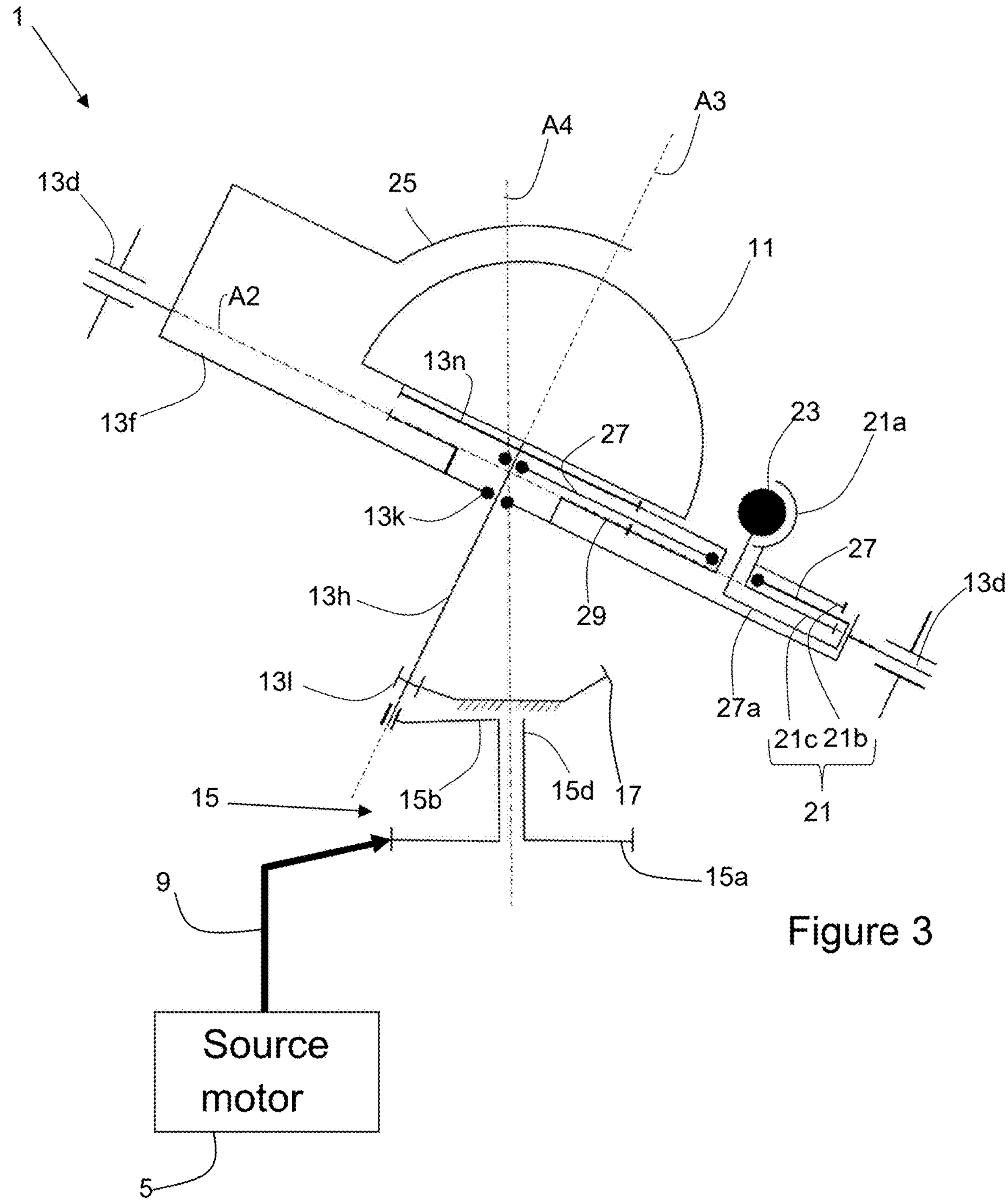
FIG. 3 is a lateral schematic view similar to that of FIG. 1, of a variant of an animation mechanism according to the invention.

FIG. 3 illustrates another embodiment of the animation mechanism 1 according to the invention. This variant differs from that of FIGS. 1 and 2 in that the second object 23 is mounted on the inner frame 13*f* orbitally. To obtain an orbital movement of the second object 23 and of its cover 21*a*, the mechanism further comprises a rotating plate 27 which bears the second decorative object 23 and which is mounted freely on the shaft 13*h* such that it can pivot about the axis A3. This plate 27 also bears the wheel 21, which is mounted to pivot on the latter and comprises an upper wheel 21*b* meshing with the toothed organ 13*n* and with a lower wheel 21*c* which meshes with a supplementary fixed wheel 29, secured to the inner frame 13*f*. The two toothed organs 21*b*, 21*c* that make up the wheel 21 are thus arranged on either side of the plate 27.

In order to support the second decorative object 23, the rotating plate 27 comprises an extension 27*a* which surrounds a part of the supplementary wheel 21*b* and extends through the centre of the wheel 21 in order to position the second object 23 on the visible side of the plate 27.

When the shaft 13*h* and also the toothed organ 13*n* pivot, the wheel 21 is driven in rotation, its lower wheel 21*c* thus rolling on the supplementary fixed wheel 29. The plate 27 thus pivots about the axis A3.

By these means, the second decorative object 23 orbits around the first decorative object 11, and the cover 21*a* moves with respect to the second decorative object 23 as described above.

The same animations as those described above in the context of the embodiment of FIGS. 1 and 2 can also be obtained with this arrangement.

Figure 4:
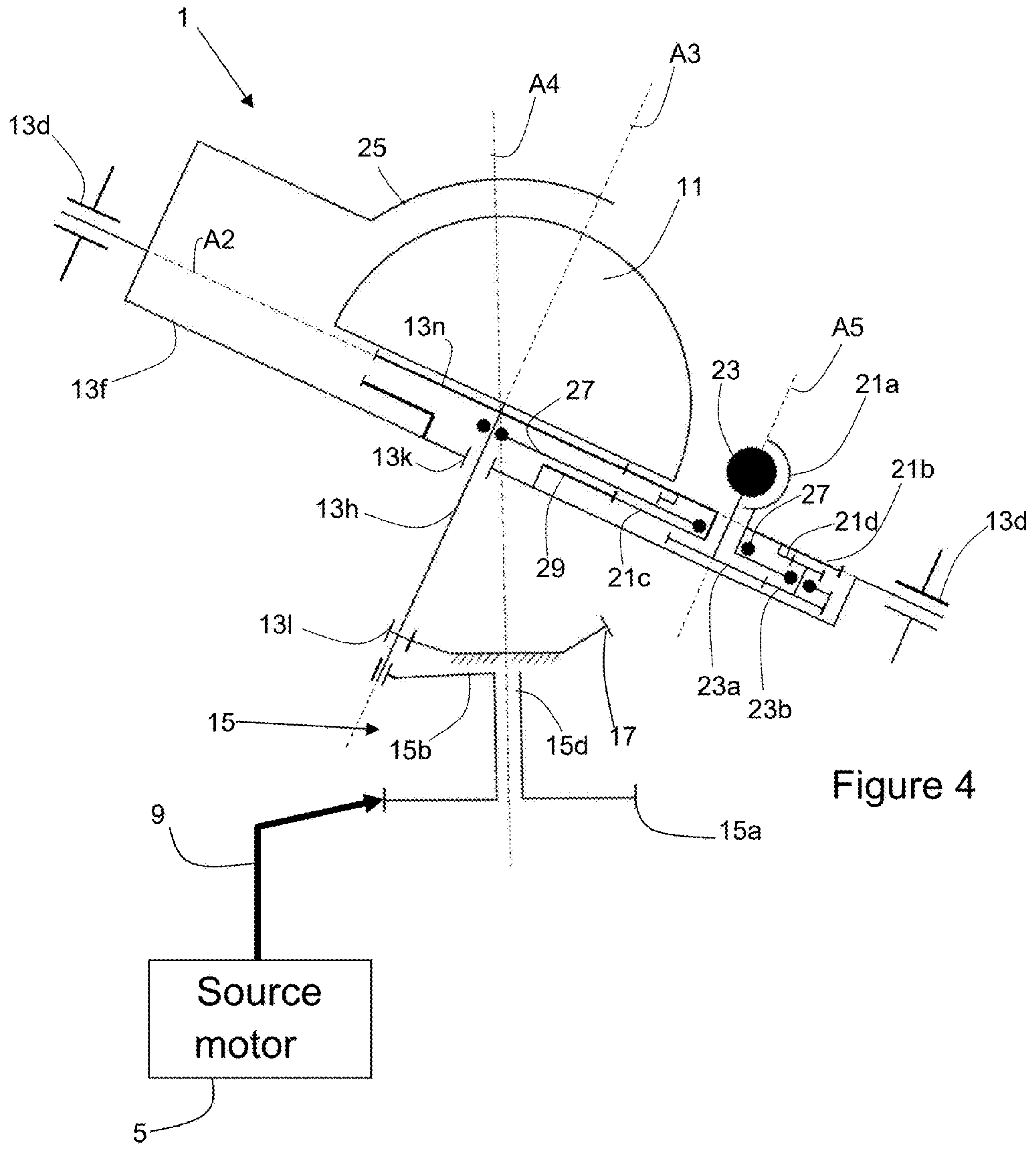
FIG. 4 is a lateral schematic view similar to that of FIG. 1, of yet another variant of an animation mechanism according to the invention.

FIG. 4 illustrates yet another variant of an animation mechanism 1 according to the invention, which differs from that of FIG. 3 in that the second decorative object 23 is also arranged to pivot about its own axis A5. In order to do this, the second decorative object 23 is secured in rotation to a wheel 23*a* which meshes with a satellite wheel 23*b* mounted to pivot on the wheel 21*c* and which meshes with a supplementary toothing 21*d* secured to the supplementary wheel 21*b* in order to form a differential gear.

By these means, the second decorative object 23 orbits about the axis A3 and pivots about its own axis A5, the speeds of rotation of the various components being able to be chosen freely by modifying the gear ratios. Moreover, it goes without saying that the covers 2*a*, 25 are optional in this variant, and that the axis A5 can be parallel or not to the axis A3, which also applies to all of the embodiments.

This arrangement is particularly suited to animating the rotation of the Earth (or of another planet) about the Sun in real time or in accelerated time, but other animations are also possible.

Figure 5:
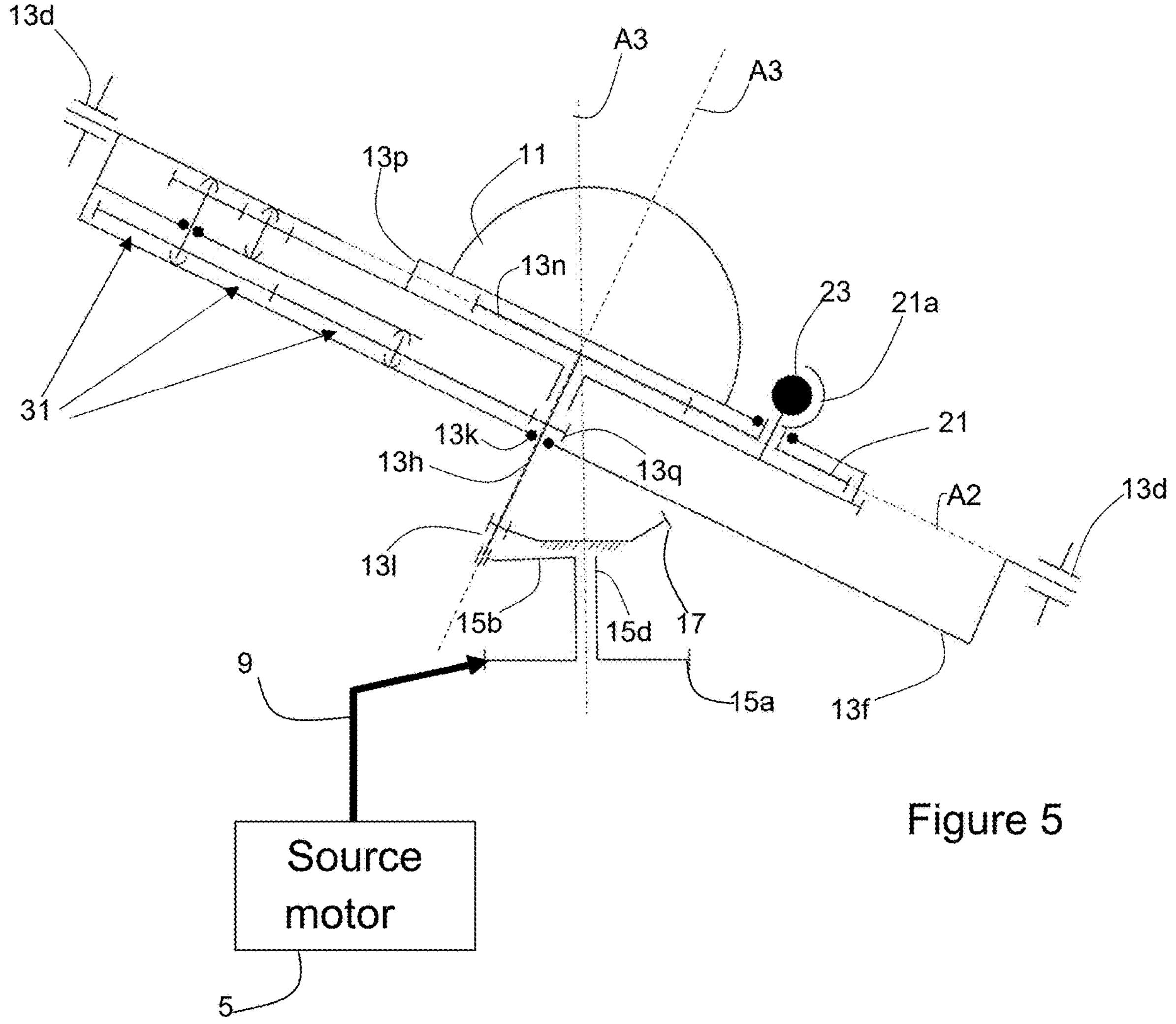
FIG. 5 is a lateral schematic view similar to that of FIG. 1, of yet another variant of an animation mechanism according to the invention.

FIG. 5 illustrates a variant of an animation mechanism 1 according to the invention, which differs from those of FIGS. 1 to 4 as will emerge hereinbelow.

Instead of being borne by the shaft 13*h*, the first decorative object 11 is borne by a supplementary frame 13*p*, mounted in the inner frame 13*f* to pivot about the axis A3. This frame 13*p* is thus decoupled from the toothed organ 13*n*, and these two elements 13*p*, 13*n* can thus pivot with respect to one another. The first decorative object 11 is also secured to the supplementary frame 13*p*, the cover 21*a* being arranged in the same way as in the embodiment of FIGS. 1 and 2 and driven in rotation by the toothed organ 13*n*, secured to the shaft 13*h*.

The supplementary frame 13*p* comprises a peripheral toothing which serves to drive it about the axis A3 by an intermediate transmission 31 of any form (here composed of a plurality of intermediate wheels pivoted on the inner frame 13*f*) which takes power from a pinion 13*q* secured to the shaft 13*h*.

In so doing, the set of the two decorative objects 11, 23 pivot about the axis A3, and the speed of rotation of the cover 21*a* can be chosen freely with respect to that of the supplementary frame 13*p*, by modifying the gear ratios of the intermediate transmission 31 or also the ratios between the toothed organ 13*n* and the wheel 21.

In a variant that is not illustrated, the first decorative object 11 is secured in rotation to the shaft 13*h* instead of the supplementary frame 13*p*, which allows the two decorative objects 11, 23 to pivot about the axis A3 at different rotation speeds.

These arrangements notably make it possible to represent the phases of the Moon.

Figure 6:
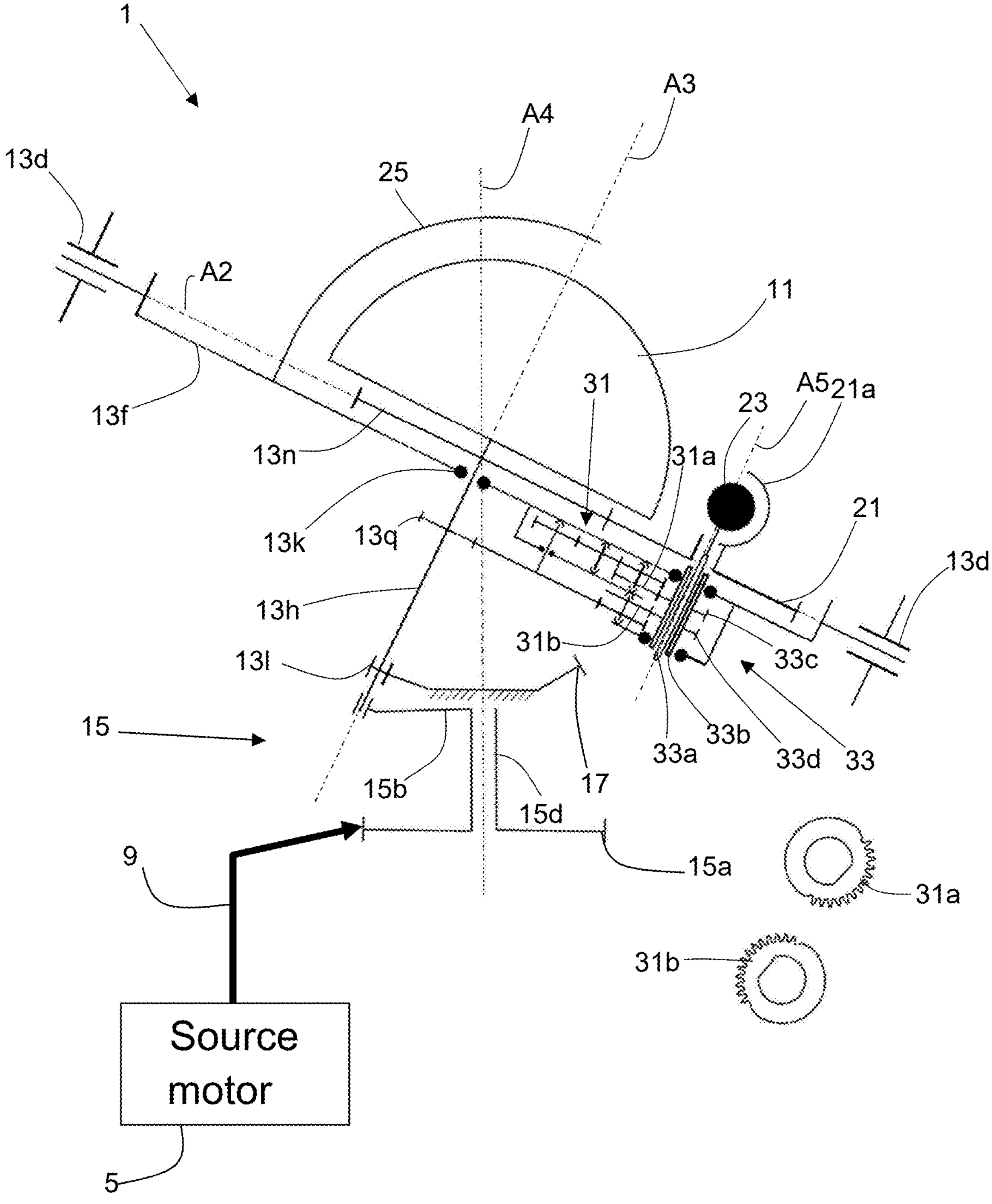
FIG. 6 is a lateral schematic view similar to that of FIG. 1, of yet another variant of an animation mechanism according to the invention.

FIG. 6 illustrates yet another variant of an animation mechanism 1 according to the invention, which differs from that of FIGS. 1 and 2 as follows.

The mechanism 1 of FIG. 6 also comprises a raising and lowering system 33, arranged to raise and lower the second decorative object 23 with respect to the plane of the inner frame 13*f*.

This raising and lowering system 33 is borne by the inner frame 13*f*, on its bottom side (that is to say its side facing the driving wheel 15).

The second decorative object 23 is borne by a threaded rod 33*a*, which is rotationally indexed with respect to the inner frame 13*f* by ad hoc means (not represented) such that the threaded rod 33*a* cannot pivot with respect to said inner frame 13*f*.

The threaded rod 33*a* is engaged in a tapped tube 33*b*, and consequently a rotation of the tapped tube 33*b* in one direction or in the other about the axis A5 will raise, respectively lower, the threaded rod 33*a* and thus the second decorative object 23. This rotation is ensured by an intermediate transmission 31 conducted by a toothed organ 13*q* secured in rotation to the shaft 13*h* like the variant of FIG. 5, and this is why the elements that are similar to the latter have the same reference symbols.

The intermediate transmission 31 of the present variant comprises an intermittent geartrain composed of two wheels with partial toothing 31*a*, 31*b*, which mesh with corresponding toothings 33*c*, 33*d* which are secured in rotation with the tapped tube 33*b* and arranged to pivot in two opposite directions of rotation. Each wheel with partial toothing 31*a* has a toothing extending over half of its circumference, and the two toothings are arranged in such a way that a 360° pivoting of each of the two wheels 31*a*, 31*b* in their opposite directions of rotation will firstly provoke a driving of the tapped tube 33*b* in a first direction of rotation under the control of one of the wheels 31*a*, 31*b*, then a driving of the tapped tube 33*b* in the other direction, under the control of the other wheel 31*b*, 31*a*, and symmetrically. The details of the other elements of the intermediate transmission 31 for reversing the direction of rotation of one of the wheels 31*a*, 31*b* with respect to the other are readily available to the person skilled in the art and do not need to be described here.

Consequently, the second decorative object 23 will rise and fall while the mechanism 1 is operating, and can for example represent the movement of the Moon with respect to the equatorial plane of the Earth due to the fact that the orbit of the Moon is not coplanar with the equator of the Earth.

Of course, other mechanisms for raising and lowering the second decorative object 23, based for example on sets of cams in a way similar to an automaton can be envisaged by way of example, without departing from the framework of the invention.

Although the invention has been previously described in relation to specific embodiments, other additional variants can also be envisaged without departing from the scope of the invention as defined by the claims.

The invention claimed is:

1. An animation mechanism for a timepiece, the animation mechanism comprising:

a support system bearing a first decorative object configured to be rotated about a first axis of rotation and a second axis of rotation under the effect of a drive source, said support system comprising a first frame mounted to pivot on a cage element about said first axis of rotation, and an inner frame mounted to pivot in said first frame about said second axis of rotation which is substantially orthogonal with respect to said first axis of rotation, said inner frame bearing a second decorative object distinct from the inner frame, and wherein said inner frame is configured to be driven by one of a crank and a lever secured in rotation to a drive wheel configured to be driven directly or indirectly by said drive source, and wherein said first decorative object is borne by a shaft mounted to pivot in said inner frame about a third axis of rotation, said shaft being secured in rotation to a pinion meshing with a toothing which is coaxial to said drive wheel, said toothing being fixed or configured to be rotated.

2. The mechanism according to claim 1, wherein said second decorative object is configured to rise up and lower down with respect to a plane of said inner frame.

3. The mechanism according to claim 1, further comprising a cover which surrounds a part of said second decorative object.

4. The mechanism according to claim 3, wherein said cover is configured to pivot about said second decorative object.

5. The mechanism according to claim 4, wherein said first decorative object is borne by a supplementary frame mounted to pivot about the third axis of rotation defined by the shaft, said supplementary frame being configured to be driven in rotation by an intermediate transmission borne by the inner frame and configured to be driven by a toothed organ secured in rotation to said shaft, and wherein said pivoting cover is secured in rotation to a wheel configured to be driven in rotation by a toothed organ secured in rotation to said shaft.

6. The mechanism according to claim 4, wherein said pivoting cover is secured in rotation to a wheel configured to be driven in rotation by a toothed organ secured in rotation to said shaft.

7. A timepiece comprising:

the mechanism according to claim 1.

8. An animation mechanism for a timepiece, the animation mechanism comprising:

a support system bearing a first decorative object configured to be rotated about a first axis of rotation and a second axis of rotation under the effect of a drive source, said support system comprising a first frame mounted to pivot on a cage element about said first axis of rotation, and an inner frame mounted to pivot in said first frame about said second axis of rotation which is substantially orthogonal with respect to said first axis of rotation, said inner frame bearing a second decorative object distinct from the inner frame, and wherein said inner frame is configured to be driven by one of a crank and a lever secured in rotation to a drive wheel configured to be driven directly or indirectly by said drive source, and wherein said first decorative object is borne by a supplementary frame mounted to pivot about a third axis of rotation defined by a shaft mounted to pivot in said inner frame, said shaft being secured in rotation to a pinion meshing with a toothing which is coaxial to said drive wheel, said toothing being fixed or configured to be rotated, said supplementary frame being configured to be driven in rotation by an intermediate transmission borne by the inner frame and configured to be driven by a toothed organ secured in rotation to said shaft.

9. An animation mechanism for a timepiece, the animation mechanism comprising:

a support system bearing a first decorative object configured to be rotated about a first axis of rotation and a second axis of rotation under the effect of a drive source, said support system comprising a first frame mounted to pivot on a cage element about said first axis of rotation, and an inner frame mounted to pivot in said first frame about said second axis of rotation which is substantially orthogonal with respect to said first axis of rotation, said inner frame bearing a second decorative object distinct from the inner frame, and wherein said inner frame is configured to be driven by one of a crank and a lever secured in rotation to a drive wheel configured to be driven directly or indirectly by said drive source, and wherein said second decorative object is configured to perform an orbital movement about said first decorative object.

10. The mechanism according to claim 9, wherein said first decorative object is borne by a shaft mounted to pivot in said inner frame about a third axis of rotation, said shaft being secured in rotation to a pinion meshing with a toothing which is coaxial to said drive wheel, said toothing being fixed or configured to be rotated, and wherein said second decorative object is borne by a rotating plate configured to pivot about said third axis of rotation.

11. The mechanism according to claim 10, wherein said rotating plate is configured to be driven in rotation by a wheel pivotingly mounted on said rotating plate and meshing with a toothed organ secured in rotation with the shaft, and a supplementary fixed wheel secured in rotation to the inner frame.

12. The mechanism according to claim 9, wherein said first decorative object is borne by a supplementary frame mounted to pivot about a third axis of rotation defined by a shaft mounted to pivot in said inner frame, said shaft being secured in rotation to a pinion meshing with a toothing which is coaxial to said drive wheel, said toothing being fixed or configured to be rotated, said supplementary frame being configured to be driven in rotation by an intermediate transmission borne by the inner frame and configured to be driven by a toothed organ secured in rotation to said shaft, and wherein said second decorative object is borne by a rotating plate configured to pivot about said third axis of rotation.

13. The mechanism according to claim 12, wherein said rotating plate is configured to be driven in rotation by a wheel pivotingly mounted on said rotating plate and meshing with a toothed organ secured in rotation with the shaft, and a supplementary fixed wheel secured in rotation to the inner frame.

14. An animation mechanism for a timepiece, the animation mechanism comprising:

a support system bearing a first decorative object configured to be rotated about a first axis of rotation and a second axis of rotation under the effect of a drive source, said support system comprising a first frame mounted to pivot on a cage element about said first axis of rotation, and an inner frame mounted to pivot in said first frame about said second axis of rotation which is substantially orthogonal with respect to said first axis of rotation, said inner frame bearing a second decorative object distinct from the inner frame, and wherein said inner frame is configured to be driven by one of a crank and a lever secured in rotation to a drive wheel configured to be driven directly or indirectly by said drive source, and wherein said second decorative object is configured to perform a rotation about its own axis.

15. An animation mechanism for a timepiece, the animation mechanism comprising:

a support: system bearing a first decorative object configured to be rotated about a first axis of rotation and a second axis of rotation under the effect of a drive source, said support system comprising a first frame mounted to pivot on a cage element about said first axis of rotation, and an inner frame mounted to pivot in said first said second axis of rotation is which frame about substantially orthogonal with respect to said first axis of rotation, said inner frame bearing a second decorative object distinct from the inner frame, and wherein said inner frame is configured to be driven by one of a crank and a lever secured in rotation to a drive wheel configured to be driven directly or indirectly by said drive source, and wherein said first decorative object is a first jewel or a first astral representation, and said second decorative object is a second jewel or a second astral representation.

* * * * *